Dec. 13, 1938. R. P. CARLTON Re. 20,946

ABRASIVE ARTICLE

Original Filed April 11, 1927

INVENTOR.
Richard P. Carlton
BY
Pane & Carpenter
ATTORNEYS.

Reissued Dec. 13, 1938

Re. 20,946

UNITED STATES PATENT OFFICE 20,946

ABRASIVE ARTICLE

Richard P. Carlton, St. Paul, Minn., assignor, by mesne assignments, to The Stratmore Company, Cleveland, Ohio, a corporation of Ohio Original No. 1,686,898, dated October 9, 1928, Serial No. 182,886, April 11, 1927. Application for reissue July 14, 1938, Serial No. 219,264

11 Claims. (Cl. 51—197)

The present invention relates in general to improvements in abrasive devices and herein relates to an improved construction and form of grinding abrasive devices, and specially for employment in the form of discs for detachable and renewable application on the ends of suitable shafts for carrying out rotary grinding processes.

While the present invention is more particularly shown and described as incorporated in a structure for rotary grinding, it will be readily understood that the invention is not limited to this form or use but is of general application in the abrasive art and therefore finds a wide field of utility.

Those skilled in the art are familiar with a rotary grinding process now in general use for polishing or grinding; that is, for removing rough spots from metal and other surfaces such, for instance, in the treatment and finishing of automobile bodies. The grinding disc heretofore in use for this purpose is usually detachably applicable to a suitable head attached to the end of a flexible shaft employed by the operator in grinding the surface to which the grinding disc is applied. Owing to the construction of the grinding head which supports the grinding disc, it has heretofore been necessary that the disc be formed in more than one part, to the end that the central portion thereof be suitably depressed to facilitate its attachment by suitable means to the rotary shaft. This was caused by virtue of the fact that ordinary paper, as employed before my present invention in grinding discs, was not possessed of characteristics permitting its distortion without rupture and it was necessary to apply a separate portion to the center of the disc for attaching it to the grinding machine. This is true of such abrasive devices whether employed in grinding machines of the rotary type where the disc or sheet had to be detachably connected to the machine, or otherwise employed on a suitable support.

The principal objects and advantages of the present invention reside in the provision of a new article of manufacture in the nature of an abrasive structure including a sheet of backing material which is flexible and ductile; the provision generally of an improved abrasive structure made either in the form of a disc or in any other suitable form for the purpose and including a paper backing which possesses the qualities of flexibility, resiliency and ductility; the provision of an improved form of abrasive device having resiliency with stiffness and ductility; the provision of an improved abrasive disc for detachable application to rotary grinding machines and the like, having the property permitting a portion thereof to be compressed, drawn or otherwise distorted from the flat shape without rupture to facilitate its attachment and securement to a support; the provision of an abrasive sheet material which, in itself, possesses a high tensile strength, toughness, density, moderate elasticity, ductility, and a high shearing resistance; the provision, in general, of an improved abrading disc capable of successful use on rotary grinding machines at speeds in excess of 4500 linear feet per minute; the provision of an improved grinding disc capable of attachment to a rotary grinding machine and of being supported at its center in a manner to permit the grinding of flat surfaces without interference from the means securing the disc to the grinding machine, that is, to the grinding head; and the provision of an improved form of grinding disc formed of a flexible material possessing resiliency and ductility which can receive directly an abrasive grit and yet permit of the medial portion of said disc being distorted without rupture by means for securing same to a grinding machine.

Among other objects of the present invention resides the provision of an improved means for adapting grinding machines having recessed heads or other similarly recessed abrasive supporting elements to use with a flat grinding sheet either in the form of a disc or otherwise.

Another object of the present invention is to provide an improved method of producing the improved article of manufacture of this invention whereby to produce the disc backing element in large quantities rapidly at low cost and with facility, and it will be understood that while a particular material is set forth herein for the purpose the invention contemplates employing any other material which possesses the characteristics of high tensile strength, toughness, density, ductility, moderate elasticity and high shearing resistance.

The foregoing and such other objects and advantages as may appear or be pointed out as this description proceeds are attained in the structural embodiment of the invention illustrated in the accompanying drawing, in which.

In automobile body building plants, flexible-shaft grinding machines are employed for removing rough spots in the metal in substantially the same manner as a dentist uses a dental engine for smoothing fillings and rough places on the teeth. Grinding machines of this type usually comprise the combination of an electric motor connected by a flexible shaft to a portable grinding head upon which is mounted a grinding disc of suitable construction.

Figure 1:
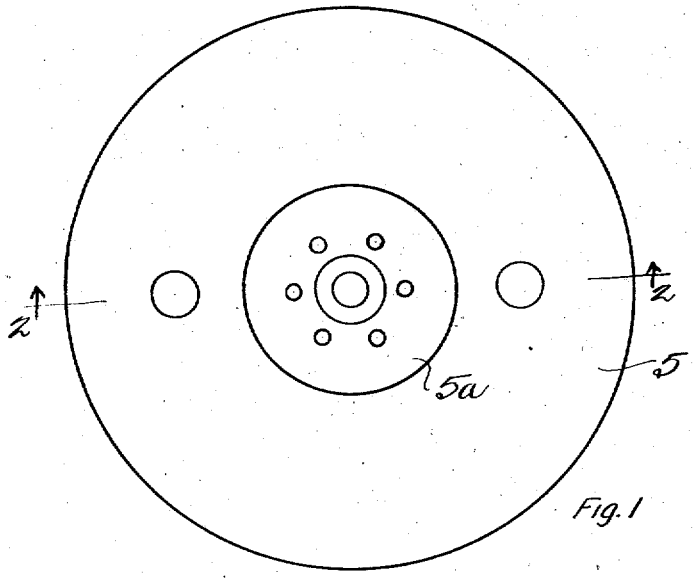
Figure 1 is a plan view illustrating a conventional construction of supporting head or plate of a rotary grinding machine upon which the abrasive sheet is mounted.
Figure 2:
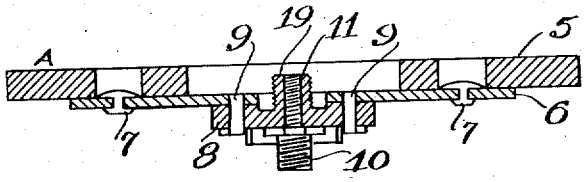
Figure 2 is a sectional view taken on the lines 2—2 of Figure 1 looking in the direction indicated by the arrows.

The usual construction of the portable grinding head is shown in Figures 1 and 2 of the drawing in which a circular felt pad 5 is secured to a disc 6 by suitable fastening means such as rivets 7—7. The plate 6 is provided with a hub-structure 8 secured thereto by rivets 9—9 into which is threaded a shaft 10. The hub 8 is provided with a threaded central hub extension 11 for receiving a cap nut to secure the grinding disc to the grinding head. The grinding head is rotated from a suitable motor (not shown) by a connection through a flexible shaft (not shown) to shaft 10. The felt disc 5 is provided with a central opening 5a for the purpose of permitting the central portion of the grinding disc and the securing bolt or screw to lie below the grinding surface, when stamped in position.

Prior to my invention, discs used on this type of machine were manufactured with a cup-like depression at the center to exactly fit in the recess provided in the center of the felt pad 5. The purpose of the cup-like depression is to permit the disc to be held from the center by a bolt, the depression permitting the head of the bolt to be drawn down below the abrading surface of the disc so that it will not interfere with the abrading operation. Furthermore, with the ordinary form of abrasive disc this cup-like depression must be provided owing to the lack of suitable capability of depression to this degree in ordinary sandpaper discs known to me.

It is obvious that the construction of a disc with a depressed center is costly. The usual method of making such a disc is to coat cloth with glue and abrasive grit in one operation, cut discs from the cloth in another operation, cut discs from the paper an another operation, form a cup-shaped recess out of paper in another operation, and glue the paper disc and cloth disc together and the recessed center to the combination in still another operation.

In the present invention I am enabled to dispense with the cup-like depression heretofore commonly employed in abrading discs and provide a substantially flat disc possessing inherently, owing to the properties of the material from which it is made, the characteristics of high tensile strength, toughness, density, moderate elasticity, high shearing resistance and ductility, thereby permitting a portion, usually the central portion, to be angularly and otherwise distorted with respect to the remainder of the disc without rupture of the disc and without appreciably weakening the disc at any point. These characteristics are necessary in the provision of a flat disc, that is, a disc not having the central depression, for the reason that the central portion must be capable of depression, that is, depression to a certain amount for securing it to the grinding head.

I find that a backing material, readily obtainable in the open market, is highly efficient and entirely suitable for my purposes, this material being known as a vulcanized fibre such as is produced in the zinc chloride treatment, or it may be vegetable parchment fibre such as is prouced by the sulphuric acid treatment. Both of the products resulting from these well known processes possess the characteristic of having resiliency yet stiffness and ductility together with other characteristics hereinbefore mentioned. The abrasive disc of my invention I usually make with a backing of fibre, either the vulcanized fibre or the vegetable parchment fibre sometimes called "fish paper", a cloth material or layer on top of the paper and a grit such as garnet, carborundum or the like, attached thereto by a suitable adhesive which, for some purposes may be ordinary glue and for other purposes, such as the water abrading operation, may be an adhesive such as disclosed and claimed in the patent to Okie, No. 1,565,027. The glue employed may also be of a waterproof nature which I am familiar with.

The vulcanized fibre is prepared by treating unsized rag paper in a warm solution of zinc chloride. After passing through the zinc chloride bath, several layers of the paper are brought together and passed through pressure rolls. The surface of each layer of paper is gelatinized in the chloride bath so that the composite welds itself together in passing through the rolls. A similar product is obtained by using the vegetable parchment paper process. The product is formed through an immersion of the paper in sulphuric acid. A deposit of gelatinous cellulose hydrate is thus formed on the surface of the paper, and by bringing several layers of thin paper so treated together, under pressure, the product resembles vulcanized paper very closely and the two papers are sold interchangeably in the market.

Abrading discs used in rotary abrading operations heretofore known to me were made by gluing abrasive cloth to a red rosin paper sometimes known as pattern paper. This paper does not possess all the characteristics referred to above, and, in addition, has little or no ductility, that is, does not, in many cases possess capability of being distorted centrally, such as is necessary with the rotary disc, without rupture during use. The fish paper, that is, either the vulcanized fibre or vegetable parchment which I employ, is much stronger per unit of thickness than the red pattern paper referred to and heretofore used for this purpose, and this fish paper furthermore possesses the properties of stiffness with a moderate degree of flexibility and ductility and, due to its greater strength per unit of thickness, makes it possible to form the disc substantially flat rather than applying a separate glued depression to the disc for securing it to the rotary head or other machine mechanism. Illustrative of this idea and merely as exemplary of one of the advantages of this invention, it is to be noted that red pattern paper heretofore used for abrading discs and the like was slightly less than 18 mils thick, such thickness being required to give the disc the necessary strength, and rigidity with proper balance of elasticity. I find that I am enabled to employ with the vulcanized fibre or vegetable parchment a paper stock from 8 to 10 mils. thick. It is obvious that this decreased thickness not only imparts added flexibility to the unit without loss of stiffness but also permits of distortion to the desired degree owing to the property of ductility possessed by the paper, permitting of its being compressed, drawn or otherwise distorted at its central part without throwing the disc out of balance on the head and without appreciable distortion of the balance of the disc and therefore permits of the employment of a substantially flat disc for this purpose. These flat discs made in accordance with my invention are sufficiently ductile and flexible at the central portion immediately under the head of the securing bolt to permit of the material of the disc at this point being drawn out of the plane of the abrading surface without buckling or otherwise distorting the balance of the disc and thereby keeping the head of the bolt from interfering with the abrading operation.

Figure 4:
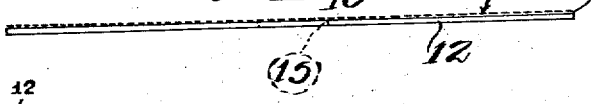
Figure 4 is illustrative of one structural form which the present invention may take.

Referring to Figure 4 of the drawing, one form of the disc of my invention is illustrated wherein the paper backing (vulcanized fibre or vegetable parchment) designated 12 is provided with a layer of cloth 13 carrying abrasive particles 14, that is, the cloth is what is known as abrasive cloth or emery cloth or the like, depending on the nature of the grit incorporated therein. The abrasive cloth is, of course, secured to the paper by suitable adhesive which may be of the same character as the adhesive employed in the cloth, such, for instance, as that disclosed in the aforesaid Okie patent. The abrasive disc, including the parts 12, 13 and 14, is, of course, provided with a central opening 15 to permit of its securement to the abrading head.

Figure 3:
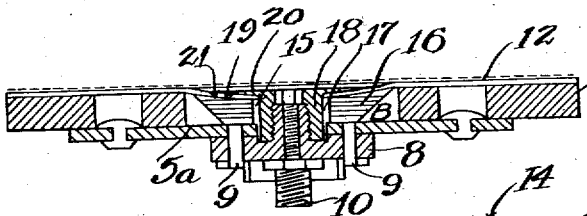
Figure 3 is a view similar to Figure 2 illustrating the improved disc of my invention applied.

Referring to Figure 3 wherein the abrading disc of this invention and the abrading head are illustrated assembled for use, the opening 5a in the felt pad 5 is of a sufficient diameter to accommodate the fiber washer 16 which latter is provided with a suitable opening 17 to receive the retaining clamping bolt 18 which latter engages the externally threaded stud extending axially from the hub 8. The outer surface of the washer 16 is concave, as indicated at 19, and the inner surface of the head 20 of the bolt 18 is complementally formed so as to grasp and retain the central portion 21 of the abrading disc 12 for retaining the disc axially on the head.

The concave portion of the fibre washer 16 is, of course, below the outer surface of the disc and it follows that the head 20 of the bolt 18 does not, therefore, interfere with the abrading operation.

The characteristics of the fish paper, that is, the vulcanized fibre or vegetable parchment, are such that this central portion 21 of the disc will be readily distorted without rupture by the head of the bolt. There is sufficient ductility in the paper itself to cause it to stretch or to be drawn at this point and there is sufficient resiliency in the paper and, of course, sufficient friction in the grit, to prevent the disc, when clamped down, from rotating relatively to the felt pad 5. It will thus be seen that by the proper design of the bolt 18 and the fibre washer 16, the recessed grinding heads of machines now in use and designed for use in connection with other grinding discs having cup-like depressions at the center, may be adapted without change in construction for use with the flat discs of my invention.

The material from which the flat discs are made may be fabricated in continuous sandpaper operation. The paper and cloth may be combined in continuous operation and the glue and abrasive grain applied thereto in the sandpaper making process. Since the holes in the cloth and fiber are the same size the discs may be cut from the completely coated and combined product in a single cutting or blanking operation.

The hole in the center of the disc just large enough to receive the shank of the securing bolt 18, and the head of the bolt makes contact with the abrasive grit. This construction not only effectively secures the disc against slipping during operation, but it also results in an arrangement in which the total strength of both the cloth and fiber or paper is effective in preventing tearing at the center where the shoulder of the bolt contacts with the disc.

The disc so made of a combination of cloth and vulcanized fiber as a backing for abrasive grain possesses very desirable qualities giving exactly the balance needed in flexibility, rigidity, and elasticity. It is sufficiently distortable to be properly held, and strong enough to give good results at high and low speeds. This disc is capable of standing up under the strains applied in coarse abrasive grits at abrading speed in excess of 4500 ft. per minute.

A disc made of vulcanized fiber on which abrasive mineral and glue are coated directly, without using any cloth, is an improvement for many grinding operations. Such a disc is found to be more satisfactory than the old sandpaper discs such as are used by dentists. The characteristics of vulcanized fiber described above make it especially practical in coated abrasive discs for many purposes, and an improvement over similar articles made with other kinds of paper heretofore. It has been found that under certain conditions the discs made of vulcanized fiber are actually better and have a longer life than the combination discs of fiber and cloth.

Figure 6:
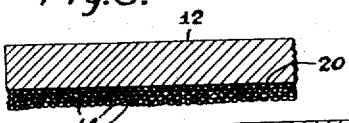
Fig. 6 is a similar view of another abrasive element.
Figure 5:
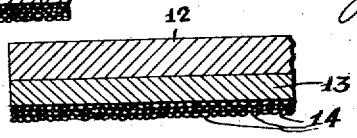
Fig. 5 is a transverse sectional view on an enlarged scale of the disk shown in Fig. 4.

In Figure 6 is shown such a disc consisting of a sheet of a treated cellulose product 12 with a layer of adhesive 20 coated directly thereon and carrying abrasive 14.

When I employ the expression "glue" herein I contemplate, of course, the employment generally of an adhesive that is, either animal glue or a waterproof adhesive, where suitable or desirable for the purpose, and, of course, only offer the Okie waterproof adhesive as an example.

Having thus described my invention and illustrated its use, what I claim as new and desire to secure by Letters Patent is:

1. A substantially flat and yieldingly flexible abrasive disc comprising a relatively rigid paper backing, a cloth backing adhesively secured thereto, and abrasive material adhesively secured to said cloth, the composite structure being sufficiently ductile to permit distortion of the central portion thereof without actual rupture and without material distortion of the entire backing.

2. A substantially flat and yieldingly flexible abrasive disc comprising a relatively rigid paper backing, a cloth backing adhesively secured thereto, and abrasive material adhesively secured to said cloth, the composite structure being sufficiently ductile to permit distortion of the central portion thereof without actual rupture and without material distortion of the entire backing, and having yielding marginal portions of sufficient strength and a central portion of sufficient rigidity to permit the disc to be driven from the central portion without producing a rupturing deflection when supported upon a flexible pad.

3. A substantially flat and yieldingly flexible abrasive disc comprising a relatively rigid paper backing treated to produce a gelatinous cellulose hydrated condition of the fibers to increase its strength and toughness, a cloth backing adhesively secured thereto, and abrasive material adhesively secured to said cloth, the composite structure being sufficiently ductile to permit of distortion of the central portion thereof without actual rupture and without material distortion of the entire backing.

4. A substantially flat and yieldingly flexible abrasive disc comprising a relatively rigid paper backing having the flexibility, resiliency, ductility and toughness characteristic of vulcanized fiber, a cloth backing adhesively secured thereto and abrasive material adhesively secured to said cloth, the composite structure being sufficiently ductile to permit of distortion of the central portion thereof without actual rupture and without material distortion of the entire backing.

5. An abrasive element comprising a sheet of cellulose product chemically treated to produce a gelatinous cellulose hydrated condition of the fibers to increase its strength and toughness, a cloth backing adhesively secured thereto, and abrasive material adhesively secured to said cloth, the composite structure having the property of distortability without disruption.

6. An abrasive element comprising a yieldingly flexible disc consisting of a backing sheet of cellulose material chemically treated to produce a gelatinous cellulose hydrated condition of the fibers to increase its strength and toughness, a cloth sheet adhesively secured thereto, and abrasive adhesively united to said cloth, the composite structure having yielding marginal portions and a central portion sufficiently rigid to permit the element to be driven therefrom without producing a rupturing deflection.

7. An abrasive element comprising a sheet of a cellulose material chemically treated to produce a gelatinous cellulose hydrated condition of the fibers and having abrasive adhesively united directly to one surface thereof.

8. An abrasive element comprising a sheet of vulcanized fiber having abrasive adhesively united directly to one surface thereof.

9. A substantially flat and yieldingly flexible abrasive disc comprising a sheet of a cellulose material chemically treated to produce a gelatinous cellulose hydrated condition of the fibers to increase its strength and toughness, and having abrasive adhesively united directly to one surface thereof, said disc having yielding marginal portions and a central portion sufficiently rigid to permit the disc to be driven therefrom without producing a rupturing deflection.

10. A substantially flat and yieldingly flexible abrasive disc comprising a sheet of vulcanized fiber having abrasive adhesively united directly to one surface thereof, said disc having yielding marginal portions and a central portion sufficiently rigid to permit the disc to be driven therefrom without producing a rupturing deflection.

11. A substantially flat and yieldingly flexible abrasive disc comprising a relatively rigid paper backing including a sheet having its fibers treated to produce a gelatinous cellulose hydrated condition thereof to increase the strength and toughness of the sheet, a cloth backing adhesively secured to said paper backing, and an abrasive material adhesively secured to said cloth, the composite structure being sufficiently ductile to permit of distortion of the central portion thereof without actual rupture and without material distortion of the entire backing.

RICHARD P. CARLTON.